United States Patent Office 2,942,470
Patented June 28, 1960

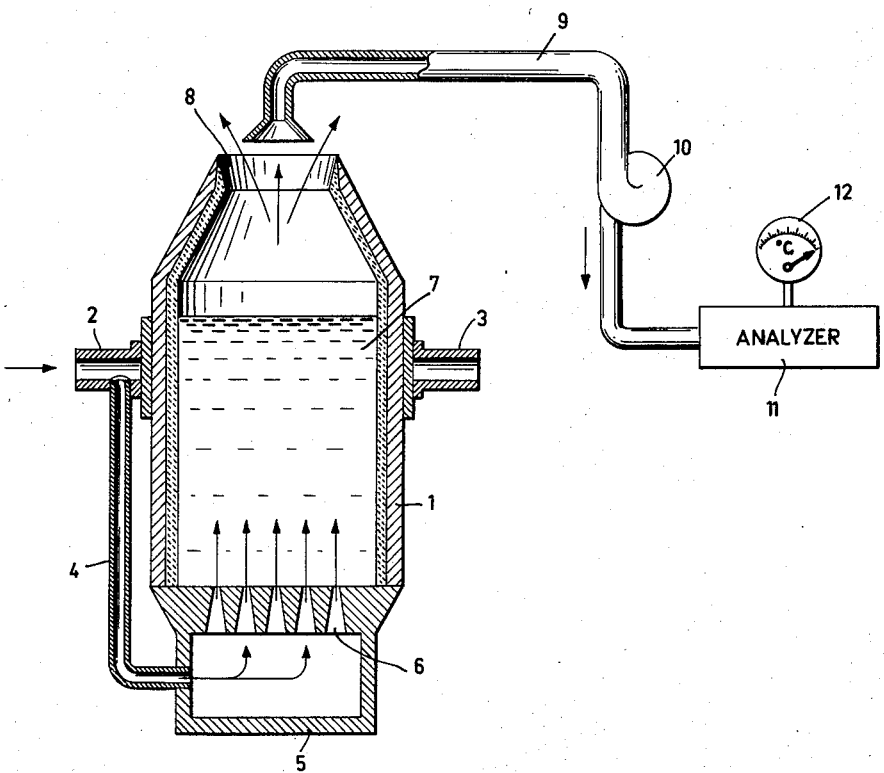

2,942,470
APPARATUS FOR MEASURING THE MELT TEMPERATURE OF AIR-BLAST CONVERTERS

Ludwig A. von Bogdandy and Heinz-Dieter Pantke, Oberhausen, Rhineland, Germany, assignors to Hüttenwerk Oberhausen A.G., Oberhausen, Rhineland, Germany, a corporation of Germany Filed Aug. 29, 1957, Ser. No. 681,047

Claims priority, application Germany Sept. 4, 1956

4 Claims. (Cl. 73—339)

The present invention relates to an apparatus for measuring the temperature of the melt in a converter using an air blast for the removal of impurities from a metal (e.g. iron).

The increasingly stringent requirements for high-quality steels and other metals produced or refined in an air-blast converter make it necessary that the temperature of the melt be accurately determined and controlled in order that the metallurgical reactions be allowed to proceed in a desired manner.

Most of the known systems for measuring the temperature of a melt utilize pyrometers responsive to the overall thermal radiation emanating from the bath. In some instances, this radiation is ascertained by a detector located underneath the bath surface, e.g. at the bottom of the converter; such systems generally measure a temperature which is higher than the true temperature of the melt on account of the local overheating which occurs in the reaction zone, i.e. at the location where the blast strikes the bath. In other cases, use is made of a pyrometer mounted in a water-cooled pipe immediately above the bath surface; this arrangement, however, generally measures a temperature which is lower than the true melt temperature by reason of the accumulation of an insulating dust layer above the bath, this being especially so in the case of an air blast enriched with oxygen as is frequently the practice in modern converters.

The present invention has for its general object the provision of an apparatus for carrying out temperature measurements in a converter which correctly reflect the average temperature of the melt. More particularly, the invention has for its object the measurement of bath temperatures without reliance upon radiation intensity.

A feature of the invention resides in analyzing the density of specific melt or slag components in the vapors leaving the bath. It has been found, in accordance with this invention, that in the course of a blow there occurs in the converter a continuous vaporization and that the vapor densities of the components referred to are directly related to the temperatures of the melt and of the slag, respectively. More specifically, it has been determined that the densities of the melt components (e.g. iron, manganese and phosphorus) are proportional to the temperature of the combustion zone, which is somewhat higher than the average bath temperature, and that the densities of the slag components (e.g. CaO, $Na_2O$, and $K_2O$) are directly proportional to the slag temperature which in turn is identical with the average temperature of the melt. For this reason, an advantageous feature of the invention resides in the separation of entrained dust particles from the vapors and in the analysis of these particles to determine their content of the aforementioned slag components.

The invention will be described in greater detail with reference to the accompanying drawing the sole figure of which illustrates, somewhat diagrammatically, an arrangement for measuring temperatures in the manner outlined above.

In the drawing there has been shown a converter 1 rotatably mounted, in bearings not shown, by means of trunnions 2 and 3. The left-hand trunnion 2 forms part of the conduit for an air stream which passes through a duct 4 into a wind box 5 and thence, by way of tuyeres 6, into the interior of the converter 1 containing the bath 7.

Above the mouth 8 of the converter there is positioned, in accordance with a feature of this invention, the intake end of a suction pipe 9 which draws off some of the vapors rising from the bath 7. This is accomplished by means of a pump 10 which may also include a separator for removing the entrained solids from the vapor stream. The vapors and/or the dust particles are then fed to an alayzer 11 which controls a temperature indicator 12 preferably calibrated directly in degrees centigrade or Fahrenheit. It will be understood that, in the event that melt components rather than slag components are analyzed, the calibration of meter 12 will have to take into account the aforementioned difference between the melt temperature and the temperature of the reaction zone. The meter may also be arranged to indicate only temperature variations rather than absolute values.

The analyzer 11 may be one of several devices well known per se. Thus, it may comprise calorimetric means for determining the reaction temperature of the desired components in a liquid medium. It may, on the other hand, comprise a spectroscopic device, advantageously a nuclear-resonance spectroscope adapted to determine the Lamor frequency of atoms introduced into a magnetic field.

The apparatus 9—12 may operate either continuously or intermittently during the blast, depending on whether it is desired to measure the temperature throughout the blowing operation or only at discrete intervals.

The length of the path from the intake of pipe 9 to the analyzer 11 should, of course, be sufficiently limited to make negligible the time difference between the formation of the vapors and the analysis of their components.

Various modifications of the system specifically described and illustrated will be readily apparent to persons skilled in the art and are intended to be embraced in the scope of the appended claims.

What is claimed is:

1. In combination, a converter, means for passing an air blast through a metallic bath in said converter, suction means for removing from said converter a part of the vapors rising from said bath, analyzer means operatively connected with said suction means for determining the density of a bath component in said vapor part, and indicator means controlled by said analyzer means for deriving from the density determination of the latter an indication of temperature.

2. The combination according to claim 1, wherein said suction means includes separator means for removing entrained solids from said vapors and feeding said solids to said analyzer means.

3. The combination according to claim 1, wherein said indicator means comprises a meter calibrated in degrees of temperature.

4. The combination according to claim 1 in which said analyzer comprises a spectroscopic device.

References Cited in the file of this patent

UNITED STATES PATENTS

| | | |
|---|---|---|
| 1,505,281 | Nagelvoort | Aug. 19, 1924 |
| 1,809,324 | Austin et al. | June 9, 1931 |
| 2,354,400 | Percy | July 25, 1944 |
| 2,613,326 | Herzog | Oct. 7, 1952 |
| 2,815,276 | Michaux | Dec. 3, 1957 |